UNITED STATES PATENT OFFICE.

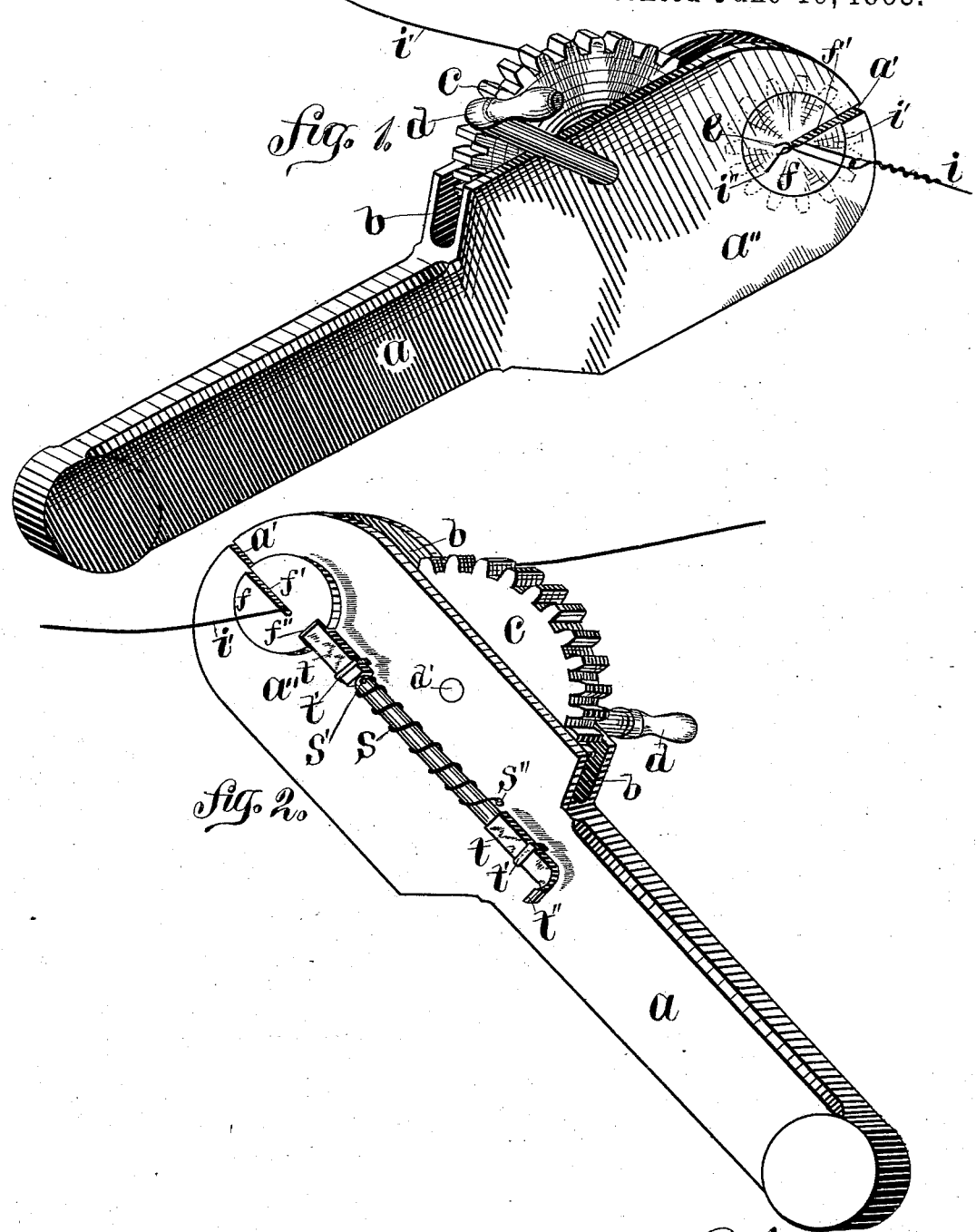

BENJAMIN F. BELL, OF YATES CENTRE, KANSAS.

WIRE-TYER.

SPECIFICATION forming part of Letters Patent No. 279,525, dated June 19, 1883.

Application filed April 23, 1883. (No model.)

*To all whom it may concern:*

Be it known that I, BENJAMIN F. BELL, a citizen of the United States, residing at Yates Centre, in the county of Woodson and State of Kansas, have invented a new and useful Improvement in Wire-Tyers, of which the following is a specification.

My invention relates to improvements in devices for tying wire; and the objects of my improvements are, first, to construct a cheap, simple, and durable wire-tyer for tying wire around baled hay, &c.; second, to construct a wire-tying device for tying together the ends of all kinds of wires. I attain these objects by the mechanism illustrated by the accompanying drawings, in which—

Figures 1 and 2 are perspective views.

Similar letters refer to similar parts throughout each view.

The handle $a$ consists of a piece of suitable material, having two parallel sides, $a''$, at one end, with a space, $b$, between them. At the outer end, and between the said sides, the slotted cog-wheel $f$ is secured. This wheel has cogs around its center or part between the sides $a''$, and has round ends with a slot, $f'$, cut longitudinally and radially and about one-half of its diameter in depth, and a staple, $e$, is secured near the inner edge of the said slot, all as shown. A slot, $a'$, is cut in the outer end of the sides $a''$, corresponding with the one in the wheel $f$, so that a wire, $i'$, may be drawn through them, as shown.

It will be seen that the drawings represent both sides of my invention, and the crank $d$ is placed on what might be termed the "right" side, so it can be used in the right hand. A large cog-wheel, $c$, is secured in the space $b$, just back of the smaller one by a shaft, $d'$, as shown, so that the cogs in the large wheel will engage with the cogs in the small wheel, for the purpose hereinafter specified. Fig. 2 represents the "left" side, or the opposite from that shown in Fig. 1. It will be seen in Fig. 2 that the end of the small wheel $f$ projects slightly beyond the surface of the side $a''$ and has a notch, $f'''$, in which the end of the spring-bolt $t$ is made to engage. The bolt $t$ is secured to the side by the staples $t'\ t'$. A spiral spring, $s$, winds around the central portion of the bolt, and one end being secured to the said bolt by screws $s'$ and the other end to the side by a screw, $s''$, as shown, so that it causes the said bolt to press against the wheel or notch $f''$ when it is not pulled back.

In the operation of my invention it is held in the left hand by the handle $a$. Put the main wire $i'$ through the slot in the wheel, as shown. Put the end $i''$ through the loop in the end of the wire $i$ and then through the staple $e$, as shown in Fig. 1. Place one finger on the hook $f''$. Then with the right hand turn the crank $d$. By turning the crank around it turns the small wheel, making the end $i''$ of the wire $i'$ turn around the wire $i'$, thus forming an ordinary "doubled and twisted" tie.

Having thus described my invention, I claim the following and desire to secure the same by Letters Patent—

1. The combination of the handle $a\ a'\ a''$, having a space, $b$, wheel $c$, wheel $f\ f'\ f''$, staple $e$, crank $d$, bolt $t$, staple $t'$, and spring $s$, all for the purpose set forth.

2. In a wire-tying device, the combination of the wheel $f\ f'\ f''$, staple $e$, wheel $c$, and crank $d$, with the handle $a$, having a slot, $a'$, all for the purpose set forth.

3. In a wire-tyer, the handle $a\ a''$, having a slot, $a'$, and space $b$, in combination with the crank $d$ for operating the drive-wheel $c$, grooved wheel $f\ f'$, and staple $e$, substantially as specified.

BENJAMIN F. BELL.

Witnesses:
   J. E. PICKETT,
   W. A. BAILEY.